United States Patent [19]
Odawara et al.

[11] Patent Number: 4,896,312
[45] Date of Patent: Jan. 23, 1990

[54] CARTRIDGE LOADING APPARATUS

[75] Inventors: Kazuharu Odawara, Yokohama; Ryoji Yamaguchi, Yutaka, both of Japan

[73] Assignee: Kabushiki Kaisha Toshiba, Kanagawa, Japan

[21] Appl. No.: 56,902

[22] Filed: Jun. 3, 1987

[30] Foreign Application Priority Data

Jun. 13, 1986 [JP] Japan .................................. 61-137481

[51] Int. Cl.$^4$ ........................ G11B 17/04; G11B 23/02
[52] U.S. Cl. .................................... 369/77.2; 369/270; 369/292; 369/291; 360/133
[58] Field of Search ...................... 369/75.2, 77.2, 270, 369/271, 292, 291; 206/309, 312, 444; 360/133

[56] References Cited

U.S. PATENT DOCUMENTS

| | | | |
|---|---|---|---|
| 4,578,787 | 3/1986 | Shimizu et al. | 369/77.2 |
| 4,614,990 | 9/1986 | Saito | 360/133 |
| 4,688,206 | 8/1987 | Nakagawa et al. | 369/291 |
| 4,736,356 | 4/1988 | Konshak | 369/77.2 |

FOREIGN PATENT DOCUMENTS 0082505  4/1986  European Pat. Off. .

*Primary Examiner*—Steven L. Stephan
*Attorney, Agent, or Firm*—Finnegan, Henderson, Farabow, Garrett and Dunner

[57] ABSTRACT

An apparatus for loading a disc-containing cartridge into a reproducing device having a head, the cartridge including a window for exposing a portion of the disc, and a movable shutter for covering the window when the cartridge is removed from the apparatus. The apparatus including a main body having a port for receiving and discharging the cartridge therethrough, a cartridge moving mechanism for moving a cartridge inserted into the port to a prescribed position within the main body adjacent to the head, including a shutter opening mechanism, and a preventing mechanism for preventing the cartridge from moving to the prescribed position when the shutter is not fully opened by the opening mechanism for reducing damage to the head during loading.

12 Claims, 13 Drawing Sheets

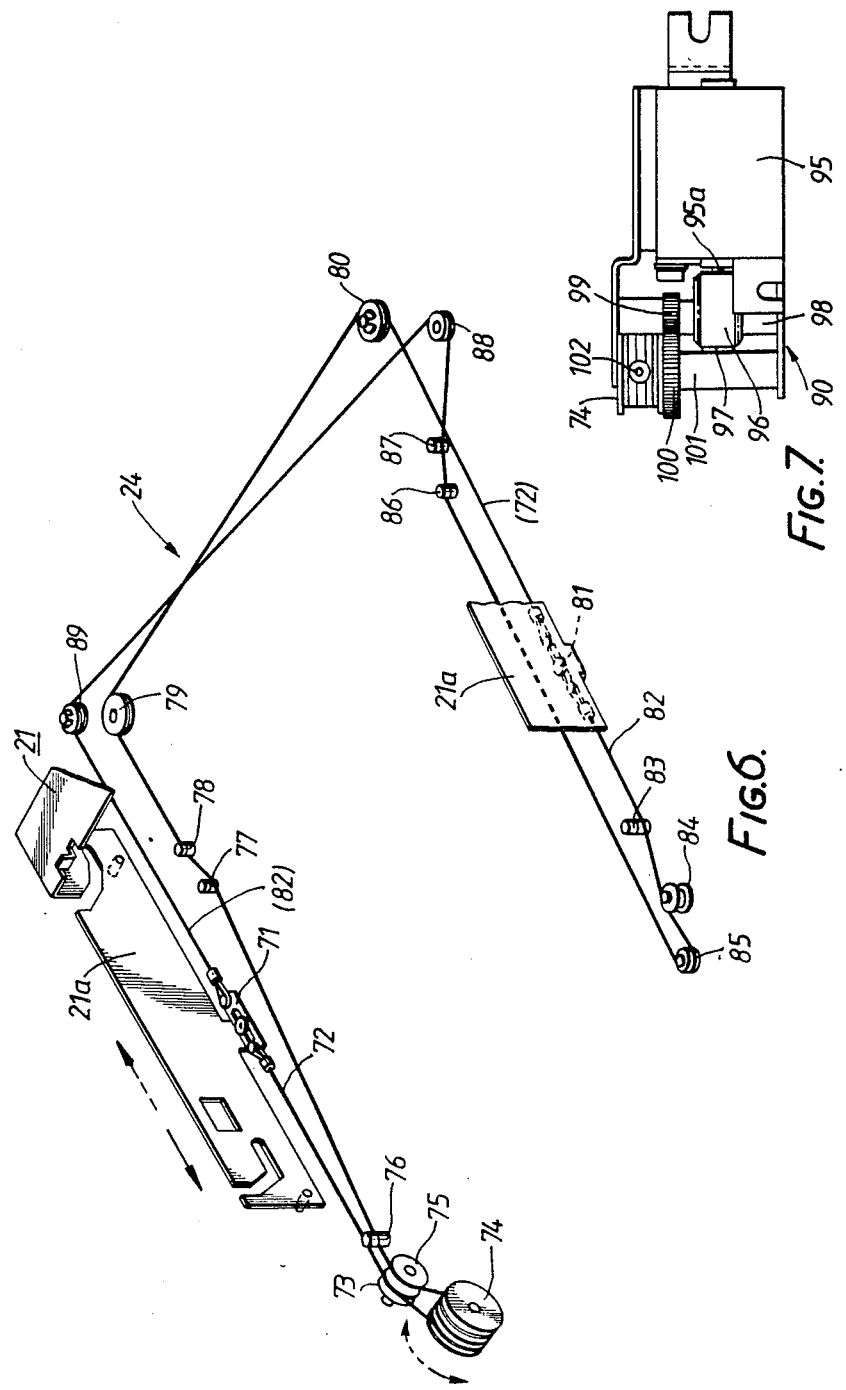

CARTRIDGE LOADING APPARATUS

BACKGROUND OF THE INVENTION

1. Field of the Invention

The present invention relates to a cartridge loading apparatus into which a disc cartridge is inserted and loaded into a prescribed position within the apparatus. The cartridge has a sliding shutter to expose a part of the disc.

2. Description of the Related Art

An optical disc apparatus which employs an optical disc as a storage medium for data has made possible a large increase in storage capacity compared with a magnetic disc loading apparatus. The optical disc apparatus can reproduce data in a stable manner with minimal noise. Further, in such an apparatus, extremely stable reproducing conditions are obtained, which substantially unaffected by external influences. Moreover, since the data processing is performed without physical contact between a recording/reproducing head and the surface of the optical disc, damage of the optical head and the optical disc are minimized. Therefore, the use of such optical disc apparatus has increased greatly.

With this trend of increased use of such an optical disc apparatus, there is now a strong demand for improved operability and for further measures to protect the optical disc, particularly during cartridge loading and unloading.

In this connection, an apparatus has been developed in which data can be processed with the disc inserted into the apparatus together with its cartridge. Thus there is no need to touch the optical disc directly with the hand. The cartridge generally has a shutter which closes when the disc is removed from the apparatus to protect the disc from damage or foreign substances.

In a conventional cartridge loading apparatus, as the disc cartridge is being inserted and loaded into its prescribed position within the apparatus, the shutter (which till then had remained shut) opens, to a position such that recording/reproducing can take place. Then, at a particular time, the optical disc starts to rotate and data is processed.

However, the conventional cartridge loading apparatus is not provided with any means of preventing the loading of the disc cartridge when, for some reason, the shutter of the cartridge does not open, or fails to open fully, as it is being loaded into its prescribed position within the apparatus.

In the conventional apparatus, therefore, when the shutter of the cartridge does not open, or fails to open fully, the shutter comes into contact with the motor, which rotates the disc, or with the recording/reproducing head. The disc motor is not likely to be damaged by this contact, but in the case of the recording/reproducing head, the possibility that substantial damage could be caused to the objective lens mounted at its top end, or to the precision elastic holder which retains the objective lens at the top end, constitutes a serious problem.

SUMMARY OF THE INVENTION

It is an object of the present invention to provide a cartridge loading apparatus which has a high level of safety, in which, the movement of the cartridge to its prescribed position is stopped by mechanical means when the shutter is not properly open.

It is further object of the invention to protect an optical disc from damage during loading, and to reduce or eliminate damage to the optical head of an optical disc storage apparatus.

According to one aspect of the present invention, there is provided an apparatus for loading a recording disc-containing cartridge into a recording/reproducing device having a head, the cartridge including a window for exposing a portion of the disc, and a movable shutter for covering the window when the cartridge is removed from the apparatus, the apparatus comprising a main body having a port for receiving and discharging the cartridge therethrough; means for moving a cartridge inserted into the port to a prescribed position within the main body adjacent to the head, including means for opening the shutter; and means for preventing the cartridge from moving to the prescribed position when the shutter is not fully opened by the opening means for reducing damage to the head during loading.

Preferably, the preventing means includes at least one projection positioned in the main body for insertion into the window when the cartridge is in the prescribed position.

According to another aspect of the present invention, there is provided an apparatus for loading a reversible recording disc-containing cartridge into a recording/reproducing device having a head, the cartridge having first and second sides, and including a window on each side thereof for exposing a portion of each side of the disc to the head, and a movable shutter for simultaneously covering both windows when the cartridge is removed from the apparatus, comprising a main body having a port for receiving and discharging the cartridge therethrough; and loading means for moving a cartridge inserted into the port to a prescribed position within the main body, including means interacting with the shutter for opening the shutter in the same predetermined direction when either the first side or the second side is oriented toward the head.

Preferably, the opening means includes a recess on the shutter, and first and second studs, one corresponding to each side of the cartridge for interacting with the recess when the corresponding first side or second side of the cartridge is oriented toward the head, respectively.

BRIEF DESCRIPTION OF THE DRAWINGS

These and other objects and advantages of this invention will become more apparent and more readily appreciated from the following detailed description of the presently preferred exemplary embodiments, taken in conjunction with the accompanying drawing of which:

FIG. 6 is an explanatory view showing the construction of a cam member drive means which is a component part of the loading mechanism;

FIG. 7 is a plan view of the drive part of the cam member drive means;

DETAILED DESCRIPTION OF THE PREFERRED EMBODIMENT

One of the preferred embodiments of the present invention will be described with reference to the accompanying drawings.

In the present invention, the cartridge loading apparatus comprises a main body having an opening for receiving and discharging the cartridge therethrough, a loading mechanism for loading the cartridge to a prescribed position within the main body, and a preventing mechanism for preventing incorrect loading the cartridge by the loading mechanism when a shutter is not open to expose a part of the disc.

Figure 1:
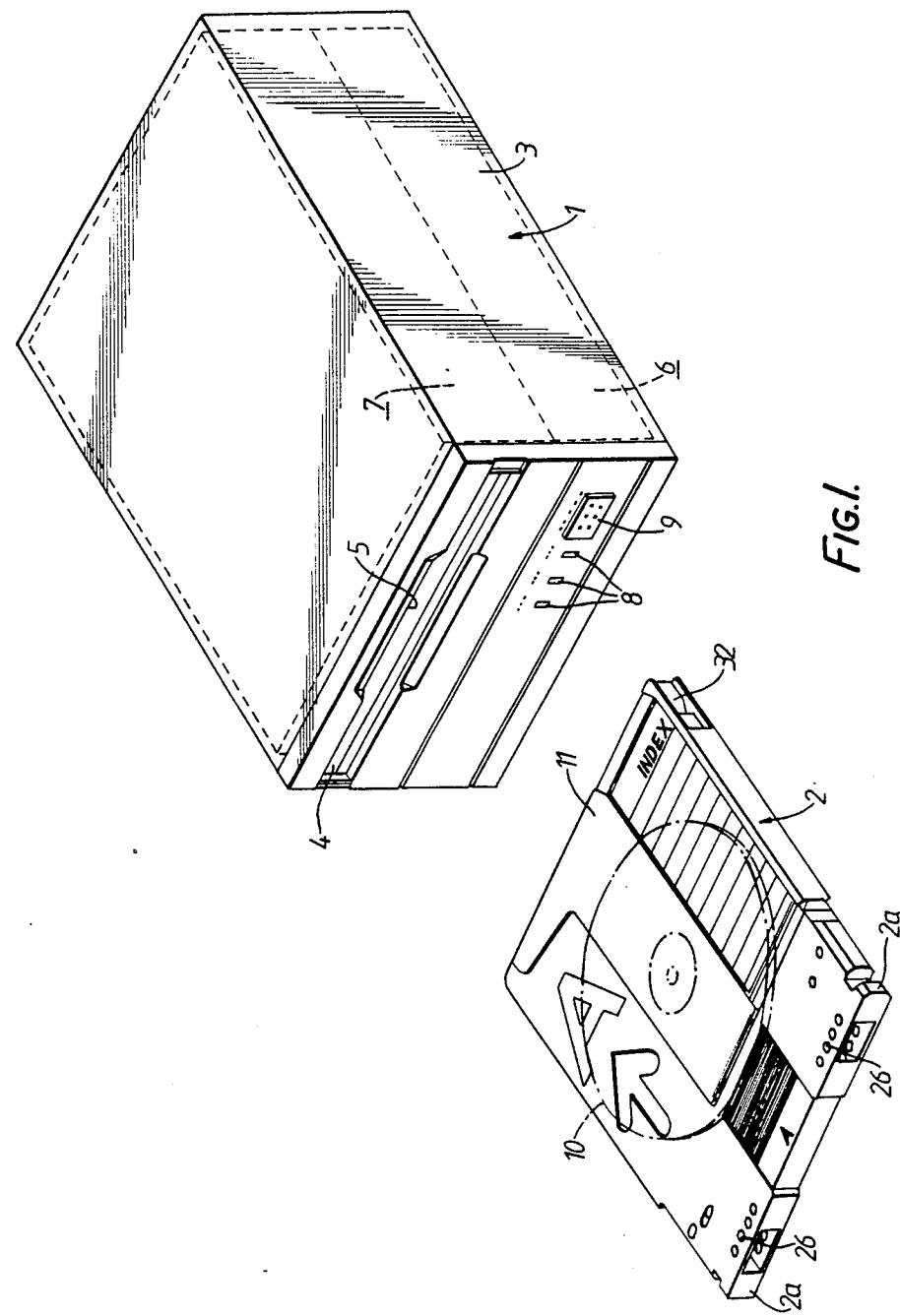
FIG. 1 is an exterior perspective view showing a cartridge loading apparatus constituting an optical disc apparatus, and a disc cartridge according to the present invention.

FIG. 1 shows an exterior view of a cartridge loading apparatus 1 for an optical disc apparatus and a disc cartridge 2 for use with this apparatus. The construction of optical disc apparatus 1 is as follows. At the front surface of a main body 3, a port 5 is formed and a shutter 4 is mounted to open and close port 5 for the insertion/removal of disc cartridge 2. Inside main body 3 are housed a drive base mechanism 6, a loading mechanism 7, and a control circuit (not shown). A state indicator 8 and a cartridge eject switch 9 are disposed at the bottom right of the front of body 3. State indicater 8 indicates an apparatus operation state, a ready state or a cartridge inserted state. Cartridge eject switch 9 is pressed by an operator when disc cartridge 2 is ejected from main body 3 through port 5.

Disc cartridge 2 (referred to below simply as "cartridge") has incorporated within it an optical disc 10 (referred to below simply as "disc"). Disc 10 has an outer diameter of about 130 mm with both sides A and B. At each surface of sides A and B, a data recording layer is formed to record and reproduce data with a laser beam or the like. It is also provided with a sliding shutter 11 for opening a window 13S (see FIG. 17) which exposes a part of disc 10.

Figure 2:
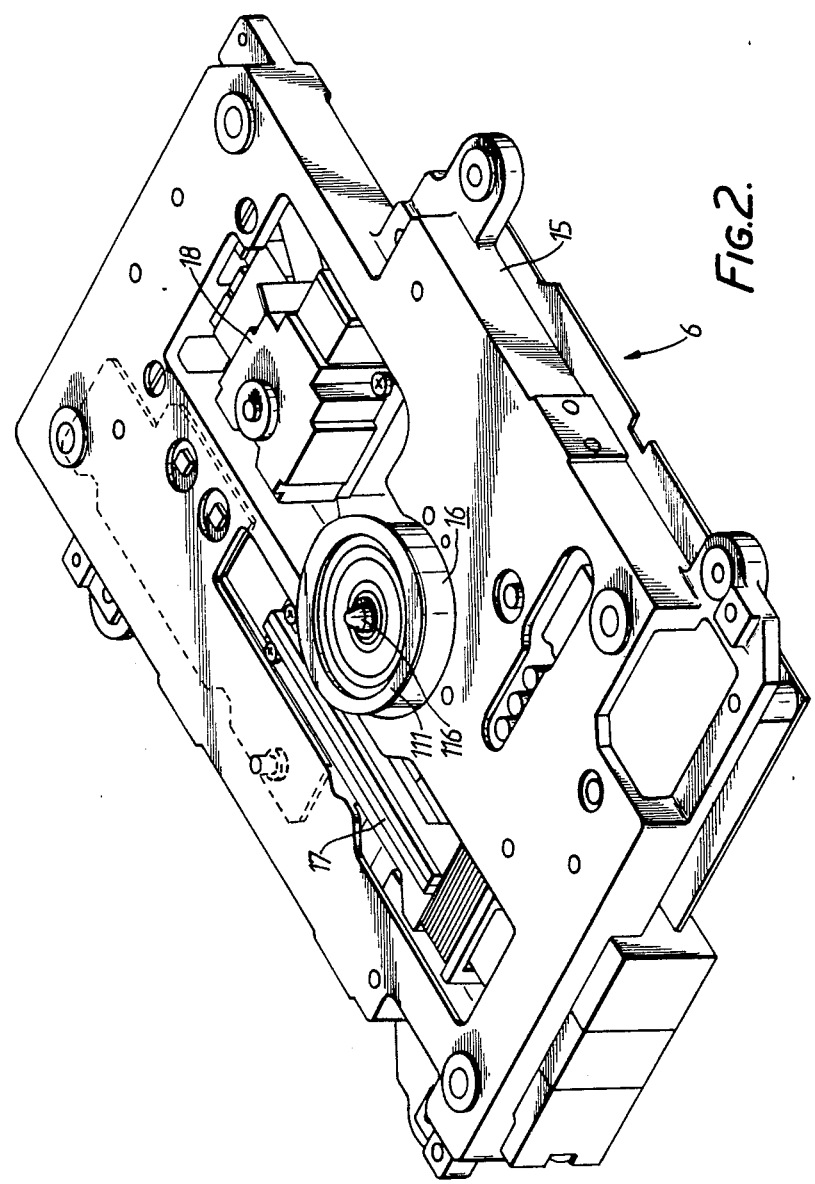
FIG. 2 is a perspective view showing a drive base mechanism which is a component part of the apparatus.

Drive base mechanism 6 is constructed as shown in FIG. 2. On a disc base 15, a motor 16 (spindle motor) is mounted to hold disc 10 and drive it in the rotary direction. Also a linear motor 17 is mounted on disc base 15 to move a recording/reproducing head 18 (optical head) in the radial direction of disc 10 to process data to/from the data recording layer on the underside of disc 10.

Figure 3:
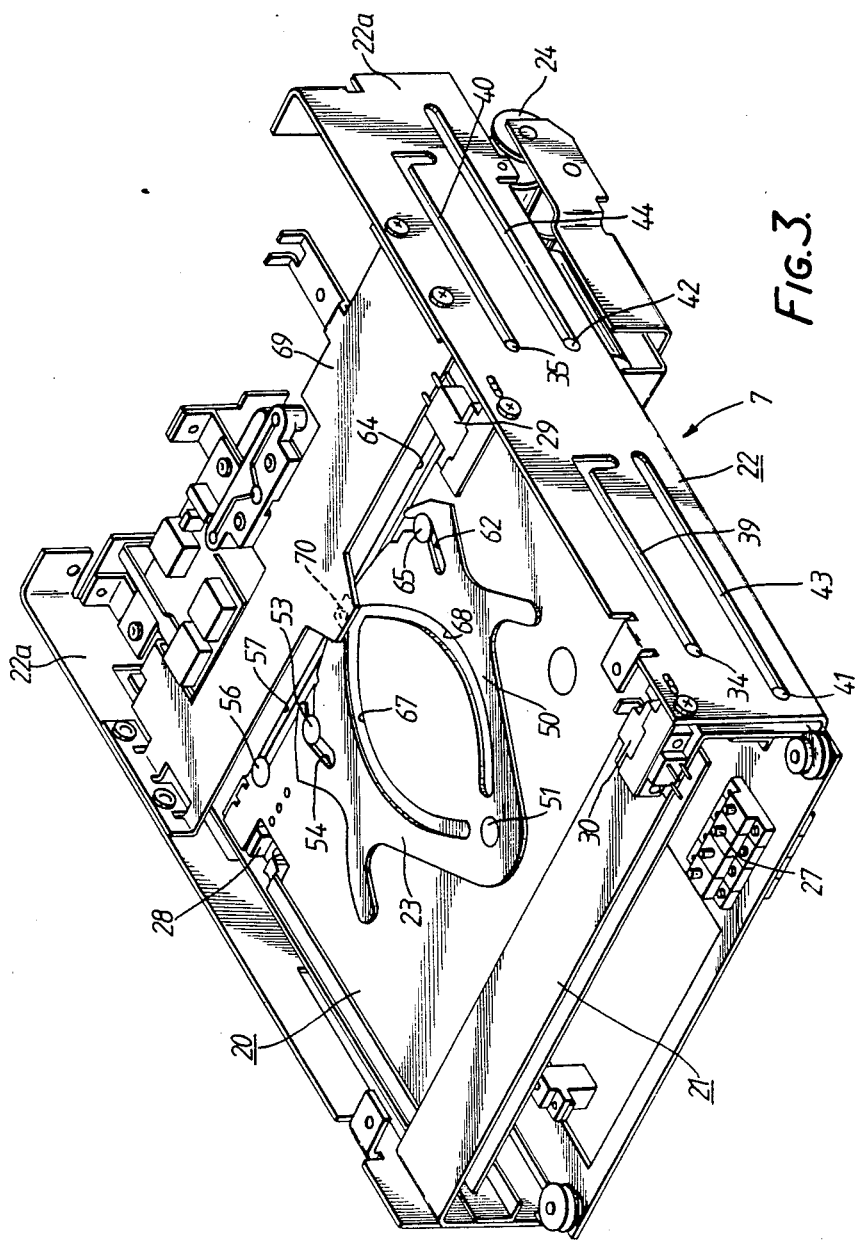
FIG. 3 is a perspective view of a loading mechanism which is a component part of the apparatus.
Figure 4:
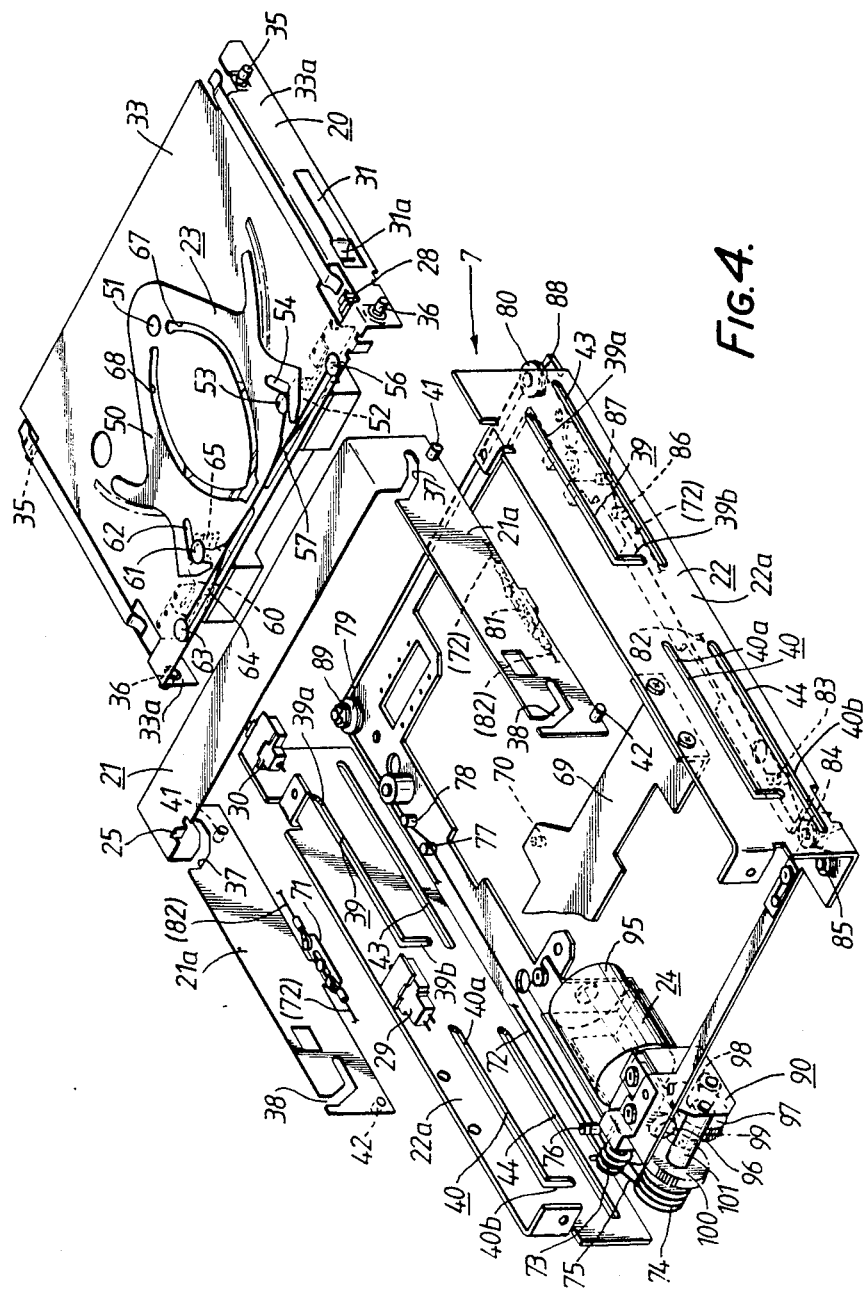
FIG. 4 is an exploded perspective view showing the loading mechanism.

Loading mechanism 7 is constructed such that it has, as shown in FIGS. 3 and 4, three component parts. These parts are a cartridge holder 20 (referred to below simply as "holder") for holding cartridge 2, a movable cam member 21 for taking this holder 20 and moving it to a prescribed position, and a guide member 22 which guides this cam member 21 and holder 20.

Holder 20 has incorporated in it a shutter moving means 23 for opening/closing shutter 11 of cartridge 2 to open or close window 13S. At guide member 22, a cam member drive means 24 for driving cam member 21, an ID push-switch 27 for detecting ID holes 26 (see FIG. 1) of cartridge 2, an insertion stop switch 29 for controlling a motor when a cartridge is inserted, and an ejection stop switch 30 for controlling a motor when a cartridge is ejected are mounted. Stop switches 29 and 30 are pushed by a projection 25 formed on cam member 21.

Snap elements 31, comprising leaf springs, are provided on the sides of holder 20. When cartridge 2 is inserted into holder 20, these snap elements 31 snap into snap recesses 32 formed on the sides of cartridge 2 (see FIG. 1), thus holding cartridge 2 in place. As this takes place, a switch 28 fixed to the end of snap element 31, detects that cartridge 2 has been correctly inserted into holder 20. Then cam drive means 24 begins to operate.

If cartridge 2 is inserted backwards, corners 2a of the rear end of cartridge 2 (see FIG. 1) collide with the rising parts 31a of snap elements 31, which stops further insertion. Also, since no pressure is exerted on switch 28, automatic intake, which is operated by a means to be described later, does not take place, and backward insertion is reliably prevented.

Guide pins 35 and 36 are mounted on sides 33a of a base 33 of holder 20. These guide pins 35 and 36, after being fitted through a first and second cam slots 37 and 38 formed on sides 21a of cam member 21, fit into guide slots 39 and 40 formed on sides 22a of guide member 22. First and second cam slots 37 and 38 are inclined at different angles. Each guide slots 39 and 40 have horizontal portions 39a and 40a along a first direction, and vertical portions 39b and 40b along a second direction substantially perpendicular to the first direction.

Guide studs 41 and 42 are mounted on sides 21a of cam member 21. These guide studs 41 and 42 fit into guide slots 43 and 44 formed on sides 22a of guide member 22. Each guide slots 43 and 44 have only a horizontal portion along the first direction. Cam member 21 can thus move in the direction of insertion of cartridge 2.

Figure 5:
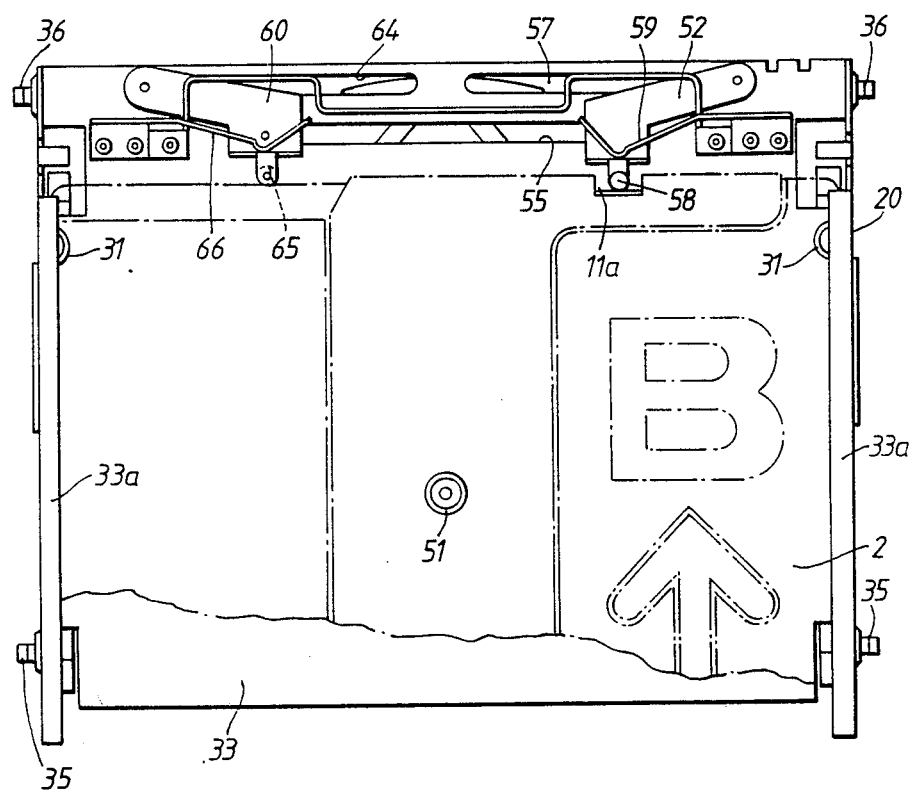
FIG. 5 is a bottom plan view showing the underside of a cartridge holder which is a component part of the loading mechanism.

An explanation will now be given, with additional reference to FIG. 5, of shutter opening/closing means 23 mounted on base 33 of holder 20. A cam plate 50 for opening/closing the shutter is mounted on the upper surface of base 33, such that is can turn about a pin 51.

A shutter lever 52 for opening/closing shutter 11 of side A of cartridge 2, has a pin 53 for moving shutter lever 52, which engages with a slot 54 formed in cam plate 50 and a lever moving slot 55 formed in base 33. A pin 56 serving as a guide member to guide the moving of shutter lever 52, engages with a shutter opening/closing slot 57 formed in base 33. A shutter opening/closing stud 58 mounted on shutter lever 52 is biased towards cartridge 2 by means of a leaf spring 59 mounted on base 33. Shutter opening/closing stud 58 is positioned such that it engages with a recess 11a formed in shutter 11 for locking shutter 11 when side A of cartridge 2 is being used.

Similarly, a shutter lever 60 for opening/closing shutter 11 of side B of cartridge 2, has a pin 61 for moving shutter lever 60, which engages with a slot 62 formed in cam plate 50 and lever moving slot 55 formed in base 33. A pin 63 serving as a guide member to guide the moving of shutter lever 60, engages with a shutter opening/closing slot 64 formed in base 33. A shutter opening/closing stud 65 mounted on shutter lever 60 is biased towards cartridge 2 by means of a leaf spring 66 mounted on base 33. Shutter opening/closing stud 65 is positioned such that it engages with recess 11a for locking shutter 11 when side B of cartridge 2 is being used.

A side A opening/closing slot 67 and a side B opening/closing slot 68 are formed symmetrically in cam plate 50 as guide slots. These slots 67 and 68 engage with a center pin 70 mounted on a fixed plate 69 which bridges guide member 22. Normally, center pin 70 is positioned at the neutral point where side A and side B opening/closing slots 67 and 68 meet. At the same time that side A of cartridge 2 is inserted into the correct position in holder 20, and snap recesses 32 engage with snap elements 31, shutter opening/closing stud 58 enters recess 11a of shutter 11, and presses on the protruding part of an elastic locking lever (not shown) mounted on the front end of cartridge 2, releasing the lock of shutter 11.

Further, shutter opening/closing stud 65 is pressed to just the extent that shutter opening/closing stud 58 enters recess 11a at the front of cartridge 2. The result of this is that since, when shutter lever 60 turns slightly about pin 63, pin 61 guides slot 62, cam plate 50 turns slightly about pin 51 to the shutter lever 60 side, and center pin 70 is guided from the neutral position to side A opening/closing slot 67. Thus far, all operations are performed automatically on the manual insertion of cartridge 2. The result is that when cam member drive means 24 operates, the whole of holder 20 moves.

An explanation will be given next of cam member drive means 24, referring to FIGS. 6 and 7.

Referring to FIG. 6, support of the wires 72 and 82 which constitute the means for moving cam member 21 will be explained. The hooked part at one end of wire 72 is secured to a wire-fastening part 71 on one side 21a of cam member 21, and the other end is extended, guided by a pulley 73. After this it is wound several times around a take-up pulley 74, which is driven by a drive means 90 to be described later. It is then taken by way of a pulley 75, pin rollers 76, 77 and 78, and large-diameter rollers 79 and 80, to be secured to a wire-fastening part 81 on the other side 21a of cam member 21.

Similarly, one end of the other wire 82 is secured to wire-fastening part 81, and the wire is then taken by way of a pin roller 83, pulleys 84 and 85, pin rollers 86 and 87, and small-diameter rollers 88 and 89 which have the same axis as large-diameter rollers 80 and 79, to be secured to wire-fastening part 71 on the other side 21a of cam member 21. This combination of large-diameter pulleys 79 and 80 and small-diameter pulleys 89 and 88 permits wires 72 and 82 to cross each other without touching.

Tensioning pulleys (not shown) disposed along the path of wires 72 and 82 ensure that these wires 72 and 82 always have a constant tension.

Referring to FIGS. 4 and 7, an explanation will be given next of a drive means 90 which drives take-up pulley 74. A worm gear 96 is mounted on a reversible rotating shaft 95a of a drive motor 95. The mechanism has a worm wheel 97, which engages with this worm gear 96, and a spur gear 99, which is of integral construction with a shaft 98 of worm wheel 97. A spur gear 100 engages with spur gear 99. Takeup pulley 74 is mounted integrally with spur gear 100 and its shaft 101. A screw 102 is screwed into take-up pulley 74. Wire 72 wrapped around pulley 74 is held down and kept tightly in place by the head of screw 102. By this means wire 72 is secured to take-up pulley 74, so that neither slips in relation to the other, and the rotation force of drive motor 95 is duly transmitted to movement of wire 72.

When take-up pulley 74 drives in the forward direction in FIG. 6 (direction of the solid line arrow), tension is applied to wire 72, and cam member 21 moves in the direction of the solid line. When take-up pulley 74 drives in the reverse direction (direction of the broken line arrow), tension is applied to wire 82, and cam member 21 moves in the direction of the broken line.

Figure 8:
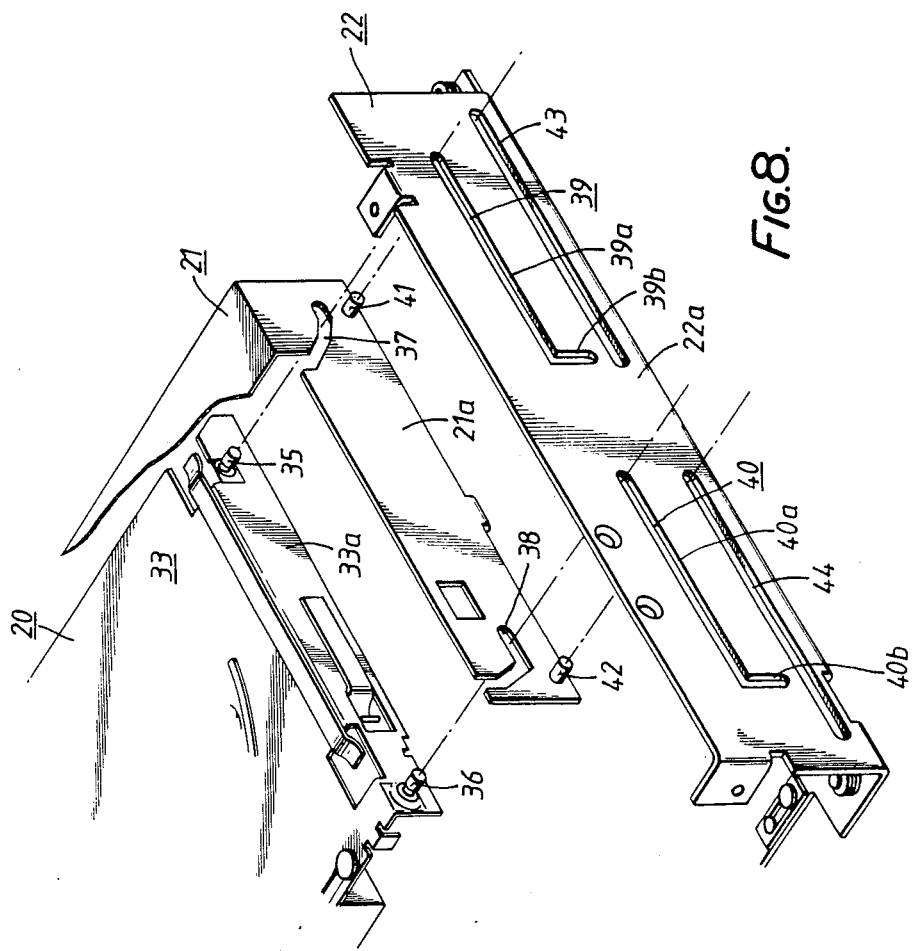
FIGS. 8 to 10 are explanatory views showing the relative positions of the loading mechanism as the cam member moves.
Figure 9:
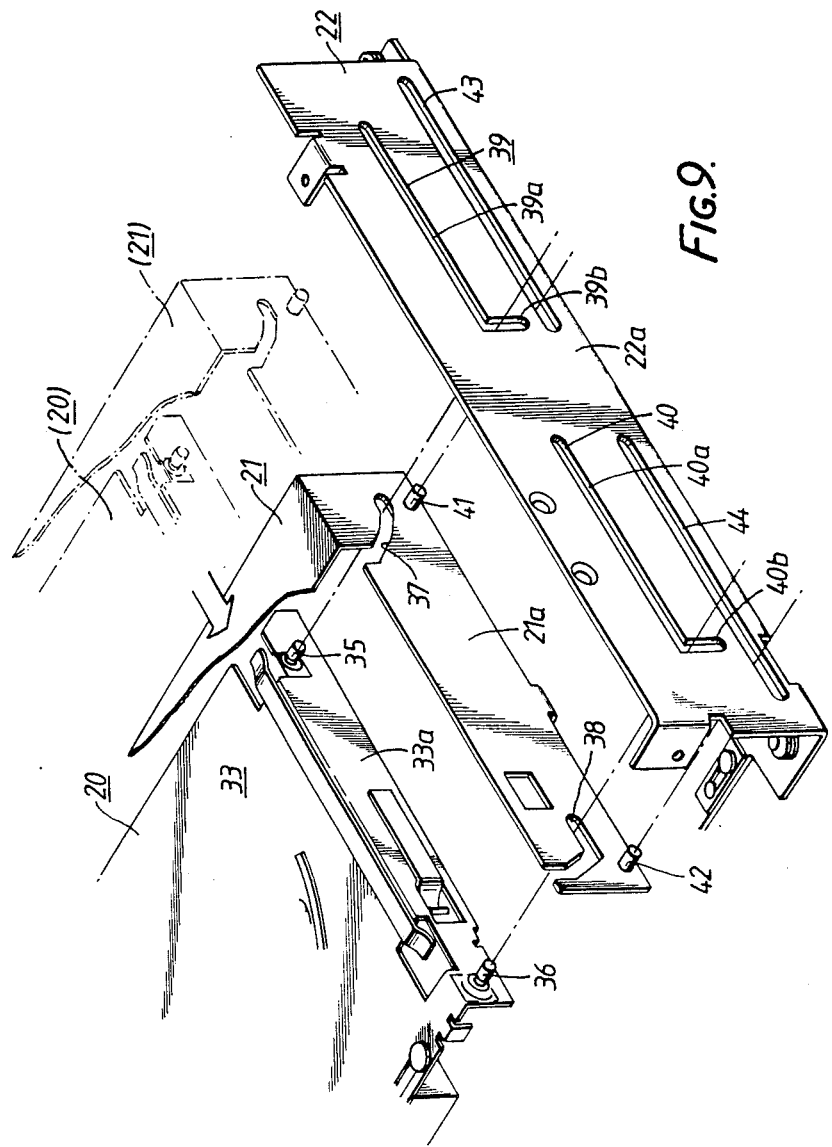
Figure 10:
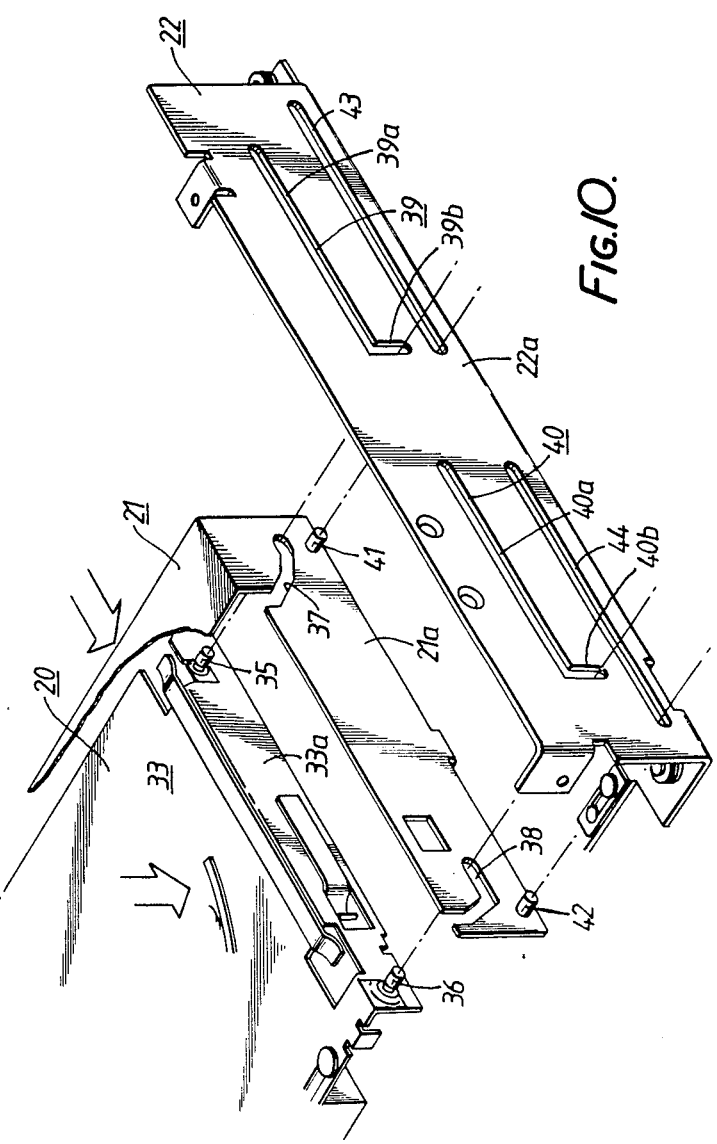

Referring to FIGS. 8–10, an explanation will be given next of the relative positions of holder 20, cam member 21 and guide member 22 when cam member 21 moves. First, FIG. 8 shows the positional state (with part of cartridge 2, which is held by holder 20, projecting from port 5) when cartridge 2 (see FIG. 1) is inserted into/withdrawn from port 5. As it is inserted into port 5, cartridge 2 is housed in holder 20, which is in the state shown. When it is inserted up to the position where it activates switch 28, as described earlier, drive motor 95 applies drive force so as to rotate take-up pulley 74 in the forward direction. By this means, cam member 21 is made to move towards the inside of the apparatus (direction of the solid line arrow in FIG. 6).

When this takes place, cam member 21 moves in a horizontal direction, as guide studs 41 and 42 are guided by horizontal guide slots 43 and 44 of guide member 22. Holder 20 also moves in a horizontal direction, forming a single unit with cam member 21, as guide pins 35 and 36 are guided by horizontal portions 39a and 40a of guide slots 39 and 40.

When the position shown in FIG. 9 is reached, the horizontal movement of holder 20 is arrested, while cam member 21 continues to move. With this operation, guide pins 35 and 36, as a result of the functioning of cam slots 37 and 38 of cam member 21, begin to lower vertical portions 39b and 40b of guide slots 39 and 40, until the state shown in FIG. 10 is reached.

In the process of movement from FIG. 8 to FIG. 9, shutter 11 is opened by shutter opening/closing means 23, which is mounted on holder 20.

Figure 11:
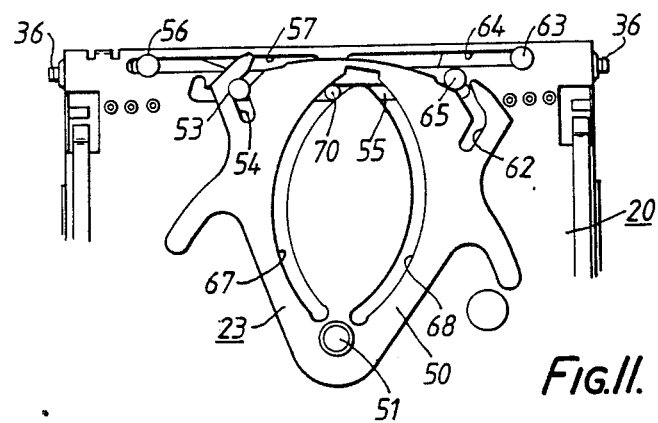
FIGS. 11 to 13 are explanatory views showing the operation of a shutter opening/closing means.
Figure 12:
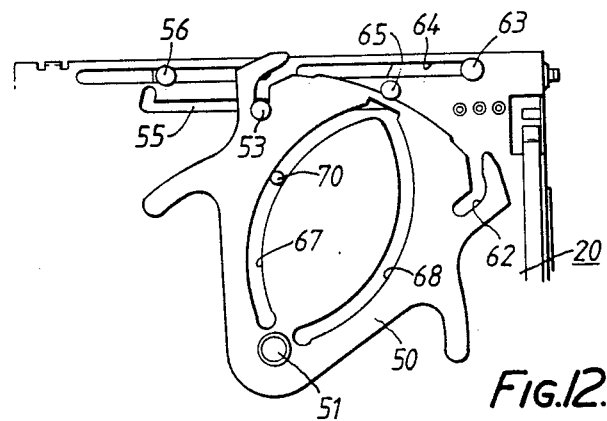
Figure 13:
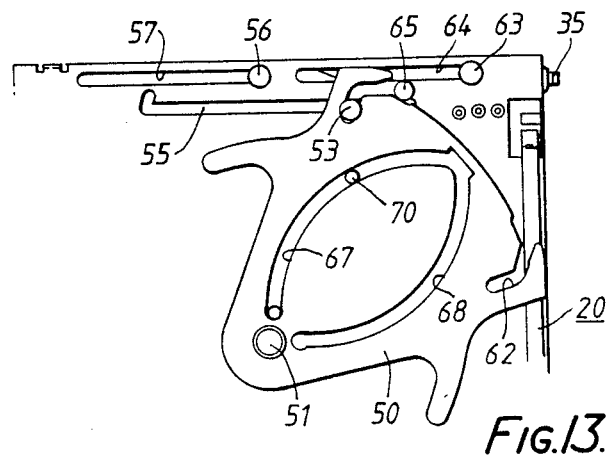

Referring to FIGS. 11–13, this operation will now be explained. When for example cartridge 2 is inserted up to the prescribed position in holder 20 with side A uppermost, cam plate 50 turns about pin 51, changing its position somewhat, and engages at the point where center pin 70 has moved slightly from the neutral position of cam plate 50 to side A opening/closing slot 67, as shown in FIG. 11. In this state, pressure on switch 28 causes cam member 21 to start to move, and holder 20 to move with it, as already described above.

When holder 20 moves, since center pin 70 is in side A opening/closing slot 67, cam plate 50 is rotated gradually, as shown in FIGS. 12 and 13. As a result, pin 53 moves to the right, following lever moving slot 55. Upon movement of this pin 53, shutter lever 52 (see FIGS. 4 and 5) is caused to move to open shutter 11 by shutter opening/closing stud 58 engaging with recess 11a formed in shutter 11. This engagement is maintained without change.

When holder 20, holding cartridge 2 with its shutter 11 already open, is lowered vertically from the state shown in FIG. 9 to that of FIG. 10, it is lowered, not in the horizontal state, but at a slight incline, owing to the difference in inclined angle between cam slots 37 and 38 formed on cam member 21. Finally, however, it is held in the horizontal position.

Figure 14:
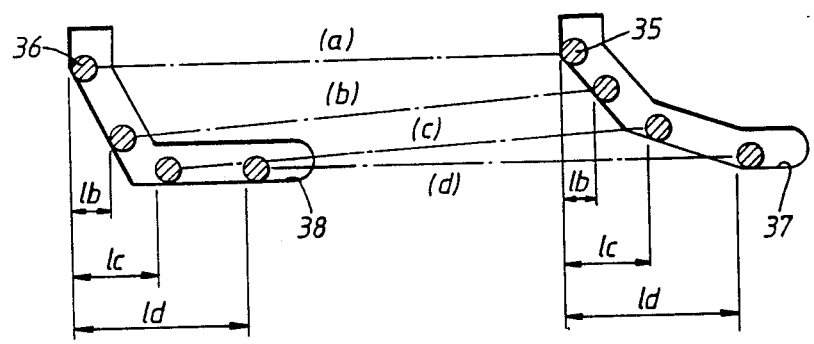
FIG. 14 is an explanatory view showing the positional relations of the cam slots and guide pins.

Referring to FIG. 14, this movement will now be explained. When cam member 21 moves by amounts 1b, 1c and 1d, the difference in shape between cam slots 37 and 38 means that the amount by which pin 35 is lowered during this movement is somewhat less than that of pin 36.

For this reason, while line (a) of holder 20 (with cartridge 2 held within it) in FIG. 14 is horizontal, lines (b) and (c) are slightly inclined, and line (d) is horizontal again.

Figure 15:
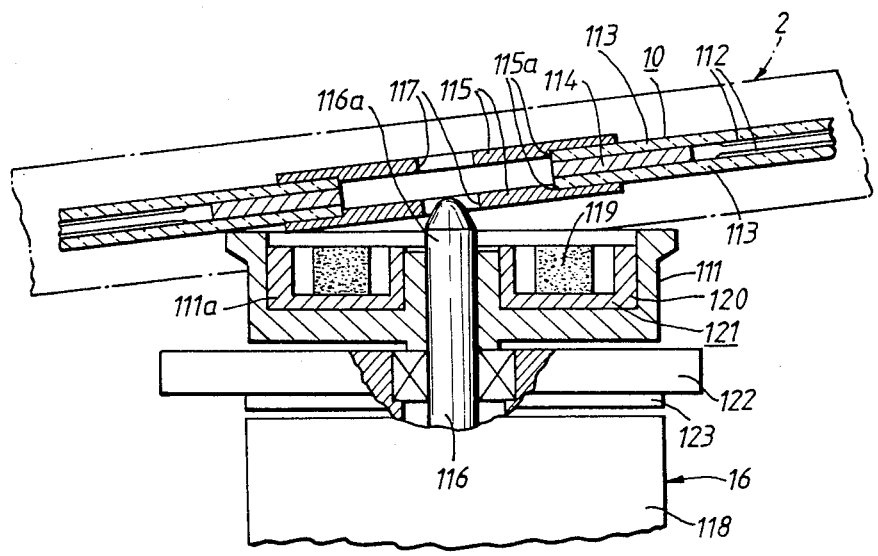
FIG. 15 is a partial sectional view showing the process involved when a disc cartridge is loaded on to or withdrawn from a turntable.

The line (c) state corresponds to the state shown in FIG. 15. In this state, a hub 115, functioning as an object of magnetic attraction, is separated from a turntable 111 of a motor 118 at a slight incline from the plane of this turntable 111. The line (d) state corresponds to the state shown in FIG. 16. In this state, hub 115 of disc 10 is now horizontal, and adheres closely to the surface of turntable 111 of motor 118. Turntable 111 houses within it a member 121 for forming a magnetic circuit including a magnet 119 and a yoke 120, which attracts hub 115 of disc 10 to turntable 111.

Figure 16:
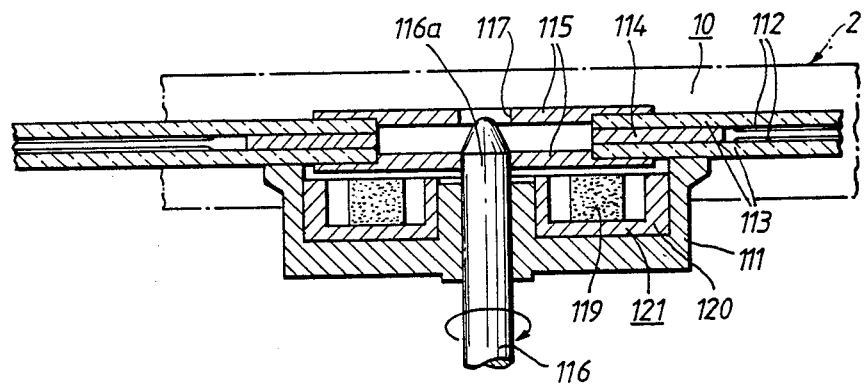
FIG. 16 is a partial sectional view showing the state when a disc cartridge has been loaded on to the turntable.

When disc 10 is removed from the state shown in FIG. 16, the attractive power of magnet 119 is cut off with minimum force by raising disc 10 at a slight angle, instead of lifting it straight from the horizontal. In addition to making for smooth operation and preventing vibration, etc., this enables the construction of the loading mechanism 6 to be kept simple. Above-mentioned cam slots 37 and 38 were designed to make this possible.

Holder 20 completes the function which is its purpose by loading disc 10 into disc motor 16 at the position shown in FIG. 10. When this takes place, insertion stop switch 29, activated by projection 25 (see FIG. 4) provided on cam member 21, stops motor 95 of cam member drive means 24.

Next, an explanation will be given of the movement of the ejection of a cartridge 2.

Motor 95 of cam member drive means 24 is made to rotate in reverse by a cartridge ejection signal, and cartridge 2 moves in the direction of port 5 (direction of the broken line arrow in FIG. 6). The opposite operation to that of insertion, which was explained by FIGS. 8-10, then takes place, with holder 20 rising from the position shown in FIG. 10 to that shown in FIG. 9. Disc 10 is removed from disc motor 16. When this takes place, since cam member 21 moves in the opposite direction to that in which it moves when cartridge 2 is inserted, the position of holder 20 moves in the line order (d)→(c)→(b)→(a), and is removed at an incline, as described earlier. After this, cam member 21 returns to the state in FIG. 8, with part of cartridge 2 projecting from port 5. In this state the movement of cam member 21 is stopped by pressing ejection stop switch 30 with projection 25 (see FIG. 4) provided on cam member 21 to stop the rotation of motor 90 of cam member drive means 24.

When this return operation takes place, shutter opening/closing means 23 mounted on cam member 21 operates, and the reverse operation to that of the opening of the shutter shown in FIGS. 11-13 is set in motion. This closes shutter 11 of cartridge 2, in addition to which shutter 11 is locked by the projecting part of the elastic locking lever (not shown) engaging with recess 11a of shutter 11.

Cartridge 2 can be withdrawn by hand, since it has returned to the position at which it was inserted. When withdrawal has been completed, cam plate 50 of shutter opening/closing means 23 is returned to its original position by the force of leaf spring 66 energizing shutter lever 60, and center pin 70 reverts to the neutral position between side A opening/closing slot 67 and side B opening/closing slot 68, as shown in FIG. 3.

Disc 10 and disc motor 16, which holds disc 10 in place by magnetic attraction and causes it to rotate, are constructed as shown in FIGS. 15 and 16. Disc 10 comprises a pair of disc-shaped substrates 113, and a ring-shaped inside spacer 114 and a ring-shaped outside spacer (not shown) sealed between the opposing surface of disc-shaped substrates 113 coaxially therewith. Data recording layers 112 are formed on opposing surfaces of substrates 113, respectively. A hub 115 made of metal subject to magnetic attraction, is mounted on each outer surface of substrates 113, over its inner periphery.

Substrates 113 consist of transparent plastic plates formed by injection moulding, bonded together by an adhesive with ring-shaped inside spacer 114 and the ring-shaped outside spacer between.

Each hub 115 has a central hole 117 which fits over the centering part 116a of shaft 116 of disc motor 16. Further, each hub 115 has a projecting part 115a formed on it, its position in relation to substrate 113 being fixed by fitting the outer rim of this projecting part 115a to the inner periphery of substrate 113.

Disc motor 16 has an outer-rotor type brushless DC motor 118, with its motor shaft serving as a rotary shaft 116 mentioned above, and a turntable 111 fixed to rotary shaft 116 of this motor 118.

Turntable 111, which is formed of non-magnetic metal material, has a recessed part 111a formed on its upper side. Member 121 forming the magnetic circuit, including magnet 119 and yoke 120 which exert magnetic attraction on disc 10, is housed in this recessed part 111a. This emits sufficient force to retain disc 10 on turntable 111, and prevents magnetism from escaping outside.

In FIG. 15, disc motor 16 and a control circuit board 123, controlling the drive of motor 118, are mounted on a frame 122.

Which of the two sides, A and B has been inserted is detected by means of ID holes 26 and a write-protect hole provided in cartridge 2.

Figure 17:
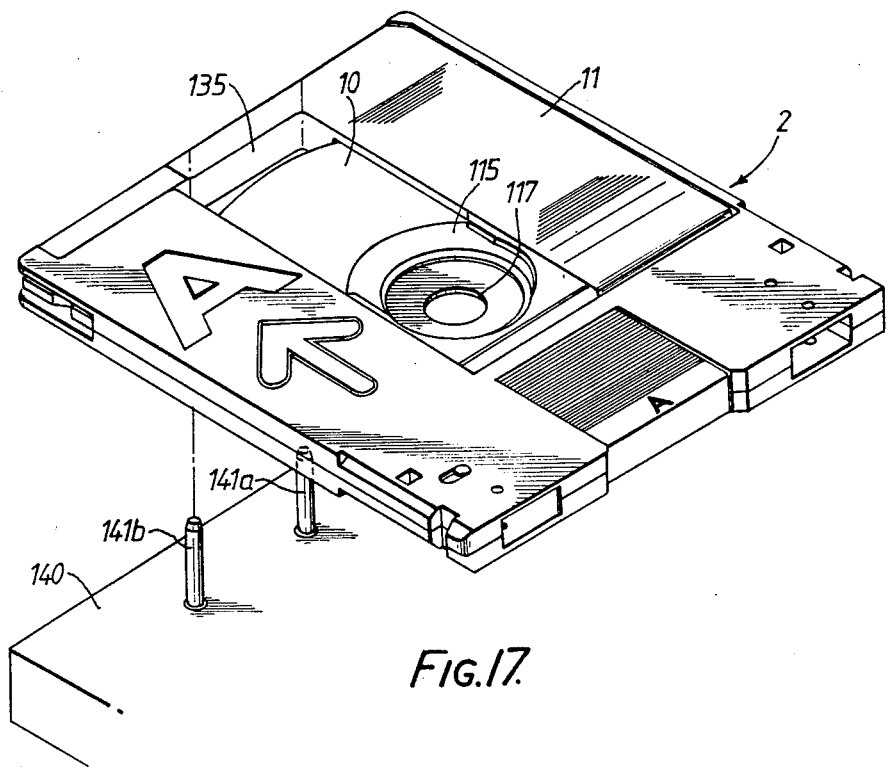
FIG. 17 is a perspective view showing the construction of the mechanism of the member for preventing incorrect loading.
Figure 18:
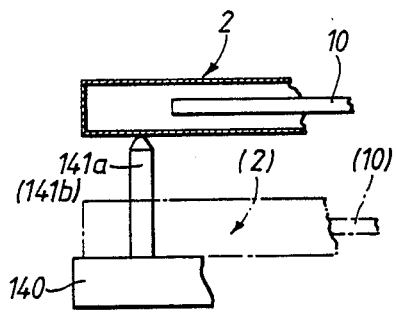
FIG. 18 is an explanatory view showing how this mechanism, shown in FIG. 17, operates.

Further, as shown in FIGS. 17 and 18, two projecting pins 141a and 141b for preventing incorrect loading are provided on frame 140 of drive base mechanism 6 in the loading direction of cartridge 2 and in a position facing window 135 of cartridge 2.

When cartridge 2 has been lowered with its shutter 11 fully open, so that it is loaded on to turntable 111 (see FIG. 2), as shown in FIG. 17, pins 141a and 141b pass through window 135, which has been opened by the movement of shutter 11, so as to permit cartridge 2 to be loaded on to turntable 111. If shutter 11 is not opened sufficiently, then, as shown in FIG. 18, shutter 11 strikes against pin 141a when side A of cartridge 2 is uppermost, and against pin 141b when side B is uppermost, thus mechanically preventing the lowering of cartridge 2, which is necessary for it to be loaded.

Figure 19:
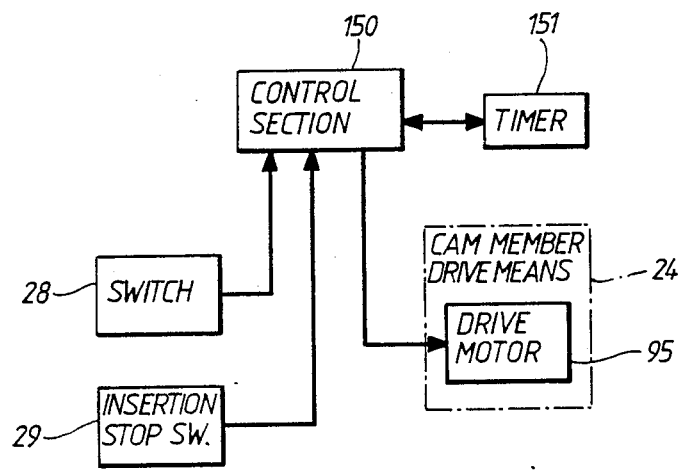
FIG. 19 is a circuit schematic showing the control of a cam member drive means.

If the lowering takes longer than given time, cartridge 2 is automatically ejected to port 5. This operation will be described with reference to FIG. 19. When cartridge 2 is inserted into port 5 so that cartridge 2 is held within cartridge holder 20, cartridge 2 actuates switch 28 to generate a detecting signal. The detecting signal is applied to a control section 150. If control section 150 receives the detecting signal from switch 28, control section 150 feeds a drive signal to drive motor 95 of cam member drive means 24. At the same time, control section 150 activates a timer 151 so that timer 151 will counts 3.0 second. Drive motor 95 drives to transport cam member 21 with cartridge holder 20 to prescribed position so that cartridge 2 is held on turntable 111. When this takes place, insertion stop switch 29 is actuated by projection 25 (see FIG. 4) provided on cam member 21, insertion stop switch 29 generates a stop signal. The stop signal is applied to control section 150. If control section 150 receives the stop signal from insertion stop switch 29, control section 150 feeds a drive stop signal to drive motor 95 of cam member drive means 24 so that transportation of cam member 21 is stopped. At the same time, control section 150 deactivates timer 151 to stop count operation. Such above loading operation is completed in the period of 2.0 second. Therefore, if the loading of cartridge 2 takes longer than a given time (2.0 second), that is, 3.0 second elapse since switch 28 is actuated, timer 151 actuates control section 150 so that control section 150 feeds a cartridges ejection signal to drive motor 95. When this takes place, drive motor 95 rotates in reverse to move cartridge 2 to port 5. Damage to any parts due to forced loading when shutter 11 is not fully open is thus reliably prevented.

As described above, the present invention is a cartridge loading apparatus for an optical disc cartridge, and includes a sliding shutter that can open a window to expose a part of the disc. The disc cartridge is inserted and loaded into a prescribed position within the apparatus. A member for preventing incorrect loading is provided at a position corresponding to the part where the disc cartridge is loaded. If the shutter is not properly opened during loading, the loading of the cartridge into the prescribed position is prevented by the shutter coming into contact with the member for preventing incorrect loading. The effect of the present invention, therefore, is that it provides a simple cartridge loading apparatus of a very high level of safety, in which the movement of the cartridge to its prescribed position is stopped by mechanical means when the shutter is not properly open.

Various other modification could be made in the invention without departing from the scope or spirit of the following claims.

What is claimed is:

1. An apparatus for loading a disc-containing cartridge into a reproducing device having a head, the cartridge including a window for exposing a portion of the disc, and a movable shutter for covering the window when the cartridge is removed from the apparatus, comprising:
   a main body having a port for receiving and discharging the cartridge therethrough;
   means for moving the cartridge inserted into the port to a prescribed position within the main body adjacent to the head, including means for opening the shutter; and
   at least one projection positioned in the main body for insertion into said window when said shutter is open to expose the disc, and for abutting said shutter to prevent the cartridge from moving to said prescribed position when said shutter is not fully opened.

2. The apparatus of claim 1, wherein the projection includes a pair of projecting pins spaced for insertion into the window when the cartridge is in the prescribed position and when said shutter is withdrawn to open the window.

3. The apparatus of claim 1 wherein the recording disc includes an optical disc.

4. The apparatus of claim 1 wherein the apparatus further includes means for ejecting the cartridge from the prescribed position to the port when the moving of the cartridge by the moving means takes longer than a given time.

5. The apparatus of claim 1 wherein the ejecting means includes timer means for counting a time elapsing since the cartridge was inserted into the port.

6. An apparatus for loading a reversible disc containing cartridge into a reproducing device having a head, the cartridge having first and second sides, and including a window on each side thereof for exposing a portion of each side of the disc to the head, and a movable shutter for simultaneously covering both windows when the cartridge is removed from the apparatus, comprising:
   a main body having a port for receiving and discharging the cartridge therethrough; and
   loading means for moving a cartridge inserted into the port to a prescribed position within the main body, including means interacting with the shutter for opening the shutter in the same predetermined direction when either the first side or the second side is oriented toward the head, said opening means including a recess on the shutter, and first and second studs, one corresponding to each side of the cartridge for interacting with the recess when the corresponding first side or second side of the cartridge is oriented toward the head, respectively.

7. The apparatus of claim 6 wherein the opening means also includes a cartridge holder for supporting the cartridge, a cam plate rotatably mounted on the cartridge holder, and a center pin fixed to the main body, the cam plate interacting with the first and second studs and the center pin for opening the shutter when the cartridge moves to the prescribed position.

8. The apparatus of claim 7 wherein the first and second studs are movable, and the cam plate includes a pair of arcuate slots, the center pin being positioned for alternate movement of the cam plate along one of the arcuate slots in response to movement of one of the first and second studs.

9. The apparatus of claim 8 wherein the loading means also includes a guide member for guiding the moving of the cartridge holder.

10. The apparatus of claim 9 wherein the loading means also includes means for moving the cartridge holder between a first position where the cartridge is located at the port when cartridge is inserted into or withdrawn from the port and a second position where the cartridge is located at the prescribed position to be associated with the head.

11. The apparatus of claim 10 wherein the cartridge holder moving means includes:
   a motor having a reversible rotating shaft; and
   wire means for operatively connecting between the reversible rotating shaft and the cartridge holder, the wire means draws the cartridge holder from the first position to the second position while the reversible rotating shaft rotates in a first direction, and draws the cartridge holder from the second position to the first position while the reversible rotating shaft rotates in a second direction reversed the first direction.

12. The apparatus of claim 11 wherein the opening means also includes means for turning the cam plate in response to the movement of the cartridge holder from the first position to the second position along the guide member.

* * * * *